United States Patent [19]

Sable

[11] 4,150,786
[45] Apr. 24, 1979

[54] TEMPERATURE SENSOR MEANS WITH INTEGRAL TEMPERATURE LIMIT FUNCTIONS

[75] Inventor: Donald E. Sable, Bloomington, Minn.

[73] Assignee: Honeywell Inc., Minneapolis, Minn.

[21] Appl. No.: 815,895

[22] Filed: Jul. 15, 1977

[51] Int. Cl.² ............................................. F24D 11/00
[52] U.S. Cl. .................................... 236/91 A; 165/18
[58] Field of Search ................ 236/91 F, 91 A, 91 G, 236/78 B, 21 B; 165/18; 323/75 H; 219/499

[56] References Cited

U.S. PATENT DOCUMENTS

| 2,949,237 | 8/1960 | De Wilde | 236/78 B |
| 3,838,811 | 10/1974 | McMann et al. | 236/21 B |

Primary Examiner—William E. Wayner
Attorney, Agent, or Firm—Alfred N. Feldman

[57] ABSTRACT

A temperature control system, shown as a differential temperature control system, uses a special temperature sensor means. The temperature sensor means includes a resistance temperature responsive element that is paralleled by one or more temperature responsive switches that act as a limit, or are connected in series with an additional temperature responsive switch that also acts as a limit.

9 Claims, 2 Drawing Figures

TEMPERATURE SENSOR MEANS WITH INTEGRAL TEMPERATURE LIMIT FUNCTIONS

BACKGROUND OF THE INVENTION

Differential temperature controls are widely used in many types of systems. In very recent times differential temperature controls for solar collector systems have become quite common. These types of systems normally include a temperature differential amplifier and control system that operate fans, pumps or similar equipment in a heating or cooling system. With the differential temperature controls, a resistance temperature sensor for the collector of a solar collector system, as well as a separate sensor for the storage temperature of the stored fluid are used. The two sensors normally are run by independent conductors to the solar collector and to the storage device.

Since solar collector type temperature control systems operate in widely varying types of climates, various types of limit functions are needed. In extremely hot climates, high limit controls are needed to prevent damage, and in the colder climates, protection is needed in the system when the storage fluid reaches or nears its freezing temperature. In the prior art type systems, solar collector temperature controls using resistance type sensors are common, but the limit functions needed are normally separate limit functions which use separate limit controls or are built into the differential amplifier itself. This makes the device rather inflexible and expensive.

SUMMARY OF THE INVENTION

The present invention is directed to a unique type of temperature sensing means which includes a temperature responsive resistor to sense a temperature, such as in a solar collector system, and further incorporates a safety limit function in the temperature sensor means itself. The temperature sensing resistor is either paralleled by, or placed in series with, a resistor and a temperature responsive switch. The switch can be either a normally open or normally closed type of switch depending on its location in a differential temperature control system. The temperature responsive switch and an appropriate resistor are used as a limit device that is automatically switched into operation when the temperature sensor means approaches a limit temperature. The switching of the secondary resistance into operation shifts and control of the differential temperature control thereby acting as a limit.

In order to accomplish the present invention in an economical fashion, the temperatures responsive resistance used is combined with a temperature responsive switch, preferentially of the thermal ferrite type, in a single enclosure that can be exposed to the temperature environment for which the device is adapted. The thermal ferrite type of switch is a well-known type of temperature responsive switch that includes a permanent magnet and a Curie point temperature responsive material so that the magnetic flux from the permanent magnet can be used as an operating medium for the switch. The thermal ferrite type switch is an exceedingly small, sealed type switch that is ideal for location with the temperature responsive control resistor for the present invention, and can be encapsulated in or enclosed in a single enclosure means so that both the thermal ferrite switch and the temperature responsive resistance basically are in a common temperature environment.

DESCRIPTION OF THE PREFERRED EMBODIMENTS

Figure 1:
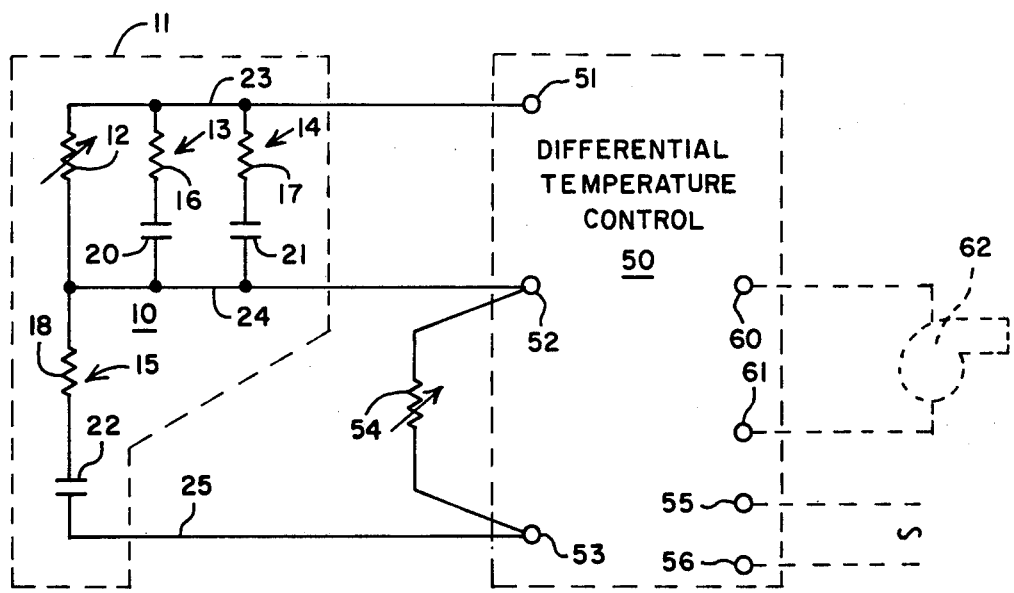
FIG. 1 is a schematic diagram of a temperature control system utilizing the temperature sensing means of the present invention.

In FIG. 1 a temperature sensor means 10 is generally disclosed and includes an enclosure means 11. The enclosure means 11 encloses the entire temperature sensor means 10 so that all of the elements of the temperature sensor means 10 are maintained in a common temperature environment. The exact form of the enclosure means 10 is not material. It could be a capsule, a capsule filled with a fluid, or merely the elements held tightly together in a plastic container, such as a heat shrinkable plastic tubing or similar material.

The temperature sensor means 10 includes a temperature responsive resistance means 12 and normally could be considered some form of thermistor having either a negative temperature coefficient or a positive temperature coefficient. In the embodiments specifically disclosed in FIG. 1, the temperature responsive means 12 is a positive temperature coefficient resistance means.

Also making up part of the temperature sensor means 10 are three temperature responsive switch means 13, 14 and 15. The temperature responsive switch means contain resistors 16, 17 and 18 along with temperature responsive switches 20, 21 and 22. The first temperature responsive switch means 13 includes the resistor 16 in series with the temperature responsive switch 20. In the disclosure of FIG. 1, the temperature responsive switch means 13 and 14 are connected in a parallel electric circuit with the temperature responsive resistance means 12 by conductors 23 and 24. The conductors 23 and 24 make up part of a connection means which further includes a conductor 25. It will be noted that the enclosure means 11, therefore, is connected to any appropriate device by the connection means 23, 24 and 25 which involve only three conductors.

Figure 2:
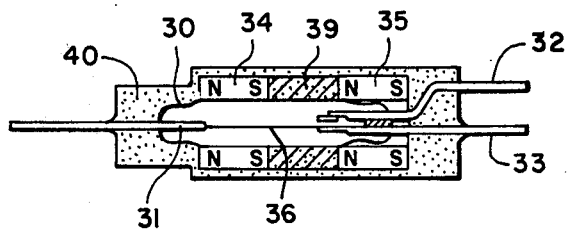
FIG. 2 is a section of a typical thermal ferrite type switch.

The temperature responsive switches 20, 21 and 22 can be of any type of temperature responsive switch. These switches could be bimetal operated switches, or mechanically operated switches that are temperature responsive. In the present disclosure the switches 20, 21 and 22 are all thermal ferrite type switches which have been disclosed in detail in FIG. 2. The thermal ferrite type of switch disclosed in FIG. 2 is made up of a glass housing 30 through which a first conductor 31 passes along with further conductors 32 and 33.d The glass housing 30 is encircled by a pair of toroidal permanent magnets 34 and 35 which provide a magnetic field to bias a reed-like member 36 that acts as the switching member between the conductors 31 and 32 or 33. A Curie point magnetic material 39 is placed between the magnets 34 and 35. All of this structure then is encapsulated in a material 40 to hold the members in place. A Curie point magnetic material is a material which is magnetic at one temperature and nonmagnetic at a different temperature. The specific temperature at which the material changes its magnetic properties is relatively sharp and has been long known.

As a switch of the type disclosed in FIG. 2 is subjected to a temperature change, the ferrite material 39 goes from one state to another thereby changing the magnetic flux that passes through the glass envelope 30 and effects the reed 36 to move between either the contact 32 or 33. The contact 32, in the disclosed embodiment, is provided for a normally open contact, while contact 33 provides for a normally closed contact. This type of switch can be manufactured and is available in exceedingly small sizes and with varying temperature responsive ranges. The switch type disclosed in FIG. 2 is the type of switch schematically represented in FIG. 1 as switches 20, 21 and 22.

In FIG. 1 the disclosure is completed by connecting the conductors 23, 24 and 25 to a differential temperature control 50. The differential control 50 is any type of a temperature control system utilizing a differential temperature control arrangement including a bridge which is completed between the terminals 51, 52 and 53. The circuitry is not material to the present invention and is well known in the electronics art. This type of differential temperature control is used extensively in solar collector temperature systems in which the terminal 51 is normally connected to the collector sensor of the solar collector system with the terminal 52 being a common connector. The terminal 53 normally is connected to the storage sensor for the system. In the present disclosure a further temperature responsive resistor 54 is disclosed and would normally be the storage sensor, and again typically would be a positive temperature coefficient thermitor. FIG. 1 is completed by power being supplied at terminals 35 and 56 to supply not only the power for the temperature control 50, but also to control power to a pair of terminals 60 and 61 which are adapted to be connected to a device 62 which has been represented as a pump, fan or similar fluid circulating type device. The particular type of device 62 used depends on the particular type of system for which temperature control is provided.

In operation, the system disclosed in FIG. 1 typically operates with the switches 20, 21 and 22 in an open circuit condition, as shown. The temperature responsive resistance 12 responds to the solar collector, while the temperature responsive resistor 54 responds to the storage fluid temperature. The temperature differential control 50 controls the pump or fan 62 as called for by the difference in responses of the resistor means 12 and 54.

The differential control 50 was described as any type of a temperature control system utilizing a differential temperature control, and that this type of a device was well known in the art. Typically, the differential control 50 would be of a type such as the device known as the R7412A as manufactured by Honeywell Inc., or any equivalent type of device. A number of such devices are available in the marketpiece. The differential control 50 responds such that it energizes the pump or fan 62 when the temperature of the temperature responsive resistance means 12 is given an "on" difference above the temperature responsive resistance 54. The pump or fan will remain "on" until the resistance of 12 is reduced to a given "off" difference above resistance means 54. At this point the pump or fan will be turned "off".

If the temperature at the positive temperature coefficient resistor 12 increases, the resistance of the positive temperature coefficient resistor also increases. This increase in temperature creates a larger and larger differential with respect to the resistance means 54 and causes the temperature differential control 50 to continue to operate the fan or pump 62 once it has started. When the resistance means 12 is placed in a collector of a solar energy system, the differential between the resistance means 12 and the resistance means 54 is normally selected so that the differential control turns the pump or fan 62 "on" to collect energy when a sufficient differential exists.

If the temperature at the resistance means 12 rises too high at the collector of a solar energy collection system, an unsafe condition can be reached. This unsafe condition is that an excessive amount of heat can be stored in the storage means by the continued operation of the pump or fan 62. The possible over temperature of the fluid collected in the storage section by the continued operation of pump or fan 62 is limited by the closing of the switches 20 or 21 thereby paralleling in sufficiently low resistances 16 or 17 in parallel with resistance 12. If the resistance values of resistors 16 or 17 are sufficiently low, it can be readily understood that when either of the switches 20 or 21 close, that a very low resistance is paralleled with the relatively high resistance of the positive temperature coefficient resistor 12 under a very hot ambient condition. As such, the temperature differential control would be caused to switch the fan or pump 62 "off" at this very high temperature point thereby preventing further energy from being stored by the operation of the pump or fan 62. This action is a limiting action in that no additional energy can be stored in the storage system even through it would normally appear to the lone resistance means 12 that energy is available for storage.

As thus can be seen, the operation of the switches 20 or 21 to lower the total resistance to a sufficient point to switch the differential temperature conrol means 50 to an "off" state, acts as a limiting function and further it causes the pump 62 to stop thereby limiting the storage of further energy.

From the above it can be seen that by providing the proper level of resistances 16 and/or 17, along with the temperature responsive switches 20 and 21, that a limiting function can be accomplished. The limitation is not at the temperature responsive resistor 12, but is in the fact that no additional energy is stored in the storage means of a solar collector system when the additional storage of energy might be excessive.

The temperature responsive means 15 has been disclosed as connected between the conductors 24 and 25 and can act to affect the operation of the device as relates to the storage temperature, as sensed and controlled by the temperature responsive resistance 54. If the temperature sensing thermal ferrite switch 22 closes on a fall in temperature, it acts to parallel the resistance 18 across the temperature responsive resistance 54 thereby changing the temperature control in an opposite manner from that of a lowered resistance across the terminals 51 and 52 since the temperature control is a differential type of temperature control.

As can be seen by the use of three conductors 23, 24 and 25 a connection means can be provided which simply connects the temperatures sensor means 10 to any type of temperature control device 50. By using a temperature responsive resistance mans 13 across one portion of the device, and means 15 across the opposite acting portion of the device, it is possible to obtain many types of variation in limit control and action. Also, by properly selecting the types of switches 20, 21 and 22 along with their resistors 16, 17 and 18 it is possible to use negative temperature coefficient sensing element 12 and 54. Normally closed switch structures are obvious from the disclosure in FIG. 2.

The present invention provides an exceedingly simple and cheap arrangement for providing a temperature sensing means that has an integral temperature limiting function that can be varied for different types of temperature control application. While a single schematic figure has been disclosed, various possible combinations of control have been disclosed within that figure and the number of combinations would be quite flexible and obvious to one skilled in the art. For that reason the present invention should be limited in its scope solely by the appended claims.

The embodiments of the invention in which an exclusive property or right is claimed are defined as follows:

1. Temperature sensor means having integral temperature limit functions adapted to be connected to a temperature control system, including: temperature responsive resistance means including connection means adapted to be connected to said temperature control system; temperature responsive switch means connected to said connection means with said temperature responsive switch means responsive to a limit temperature to override the control of said temperature responsive resistance means in the event said limit temperature is reached; said temperature responsive switch means including at least a temperature responsive switch in series with a resistor with said resistor having an ohmic value selected to be parallel connected with said temperature responsive resistance means to cause said sensor means to safely limit the operation of said temperature control system at said limit temperature; and enclosure means enclosing said temperature responsive resistance means and said temperature responsive switch means in a common temperature environment.

2. Temperature sensor means as described in claim 1 wherein said temperature responsive switch is a thermal ferrite type of switch using a Curie point temperature responsive material to cause said switch means to operate at said limit temperature.

3. Temperature sensor means as described in claim 2 wherein said temperature responsive resistance means is a positive temperature coefficient resistor and said temperature responsive switch is a normally open switch.

4. Temperature sensor means as described in claim 1 wherein said temperature responsive switch means includes a plurality of temperature responsive switches each responsive to a different temperature and including a series connected resistor with said resistors each having an ohmic value selected to be parallel connected with said temperature responsive resistance means to cause said sensor means to change the control of said temperature control system as said temperature responsive switches operate.

5. Temperature sensor means as described in claim 4 wherein said temperature responsive switches are a thermal ferrite type of switch using a Curie point temperature responsive material to cause said switch to operate as said different temperatues are reached at said sensor means.

6. Temperature sensor means as described in claim 1 wherein said temperature responsive switch means includes a plurality of temperature responsive switches each responsive to a different temperature and each including a series connected resistor with said resistors each having an ohmic value selected to be connected to said temperature control system when said temperature responsive switches operate; and said connection means including three conductors so that said temperature responsive switches can be connected in series with one another between said three conductors to provide a differential control of said temperature control system.

7. Temperature sensor means as described in claim 6 wherein said temperature responsive switches are thermal ferrite types of switches using a Curie point temperature responsive material to cause said switch means to operate to control said temperature control system.

8. Temperature sensor means as described in claim 7 wherein said temperature responsive resistance means is a positive temperature coefficient resistor and said temperature responsive switches are normally open switches.

9. Temperature sensor means as described in claim 8 wherein said temperature responsive switch means includes said temperature responsive switches and their associated resistors connected with said temperature responsive resistance means to cause said sensor means to change the control of said temperature control system as said temperature responsive switches operate.

* * * * *